FEEDBACK COMPENSATED MAGNETOSTRICTIVE VIBRATION DEVICE

Filed March 20, 1961 3 Sheets-Sheet 1

INVENTOR.
CLAUS KLEESATTEL
BY Alvin Sinderbrand
ATTORNEY.

Sept. 29, 1964 C. KLEESATTEL 3,151,284

FEEDBACK COMPENSATED MAGNETOSTRICTIVE VIBRATION DEVICE

Filed March 20, 1961 3 Sheets-Sheet 2

INVENTOR.
CLAUS KLEESATTEL
BY [signature]
ATTORNEY

Sept. 29, 1964 C. KLEESATTEL 3,151,284

FEEDBACK COMPENSATED MAGNETOSTRICTIVE VIBRATION DEVICE

Filed March 20, 1961 3 Sheets-Sheet 3

INVENTOR.
CLAUS KLEESATTEL
BY Alvin Sinderbrand
ATTORNEY

United States Patent Office 3,151,284
Patented Sept. 29, 1964

3,151,284

FEEDBACK COMPENSATED MAGNETOSTRICTIVE VIBRATION DEVICE

Claus Kleesattel, Forest Hills, N.Y., assignor to Cavitron Ultrasonics Inc., Long Island City, N.Y., a corporation of New York Filed Mar. 20, 1961, Ser. No. 97,011
13 Claims. (Cl. 318—118)

This invention relates generally to electro-mechanical resonant systems, and more particularly is directed to improvements in electro-mechanical resonant systems of the type in which high frequency vibrations are generated in the mechanical part by a polarized magnetostrictive transducer having a driving coil associated therewith and through which an alternating current is fed from a variable frequency alternator or oscillation generator.

Electro-mechanical resonant systems of the described character may have a suitable tool connected to the transducer by way of a tool holder and a connecting body, which may act as an acoustic impedance transformer for either amplifying or decreasing the amplitude of the longitudinal vibrations transmitted therethrough to the tool, whereby the high frequency longitudinal vibrations set up in the tool may be employed in performing ultrasonic machining, forming, welding, cleaning or other operations. The maximum amplitude of vibration at the working end of the tool is obtained when the frequency of the vibrations is such that the overall length of the tool, tool holder, connecting body and transducer is approximately equal to an integral number of half-wavelengths of the compressional or standing waves set up therein. Thus, in order to obtain the optimum amplitude of vibration at the working end of the tool, the frequency of the electrical oscillations or biased alternating current delivered to the driving coil of the magnetostrictive transducer should be correlated to the mechanical portion of a system, that is, should be at the natural frequency of the mechanical part of the system, or at a harmonic thereof. Since the natural or resonant frequency of the mechanical part of the resonant system is influenced by various factors, for example, changes in the tool, tool wear, and variations in temperature and loading, it is necessary to vary the frequency of the electrical oscillations or biased alternating current fed to the driving coil of the transducer from the oscillation generator in accordance with changes in the natural frequency of the mechanical part of the resonant system induced by such factors.

It has previously been proposed to effect the necessary adjustment of the frequency of the oscillation generator either manually by an operator, or automatically under the control of a feedback signal varying with the impedance of the transducer, as in U.S. Letters Patent No. 2,872,578, issued February 3, 1959, to Kaplan and Turner, or a feedback signal obtained from a pickup, for example, a piezo-electric crystal or the like which is coupled to the mechanically vibrating part of the resonant system and which has a relatively low output signal. In such existing systems, whether manually or automatically controlled, the oscillation generator is of complex construction and requires a number of amplification stages.

Accordingly, it is an object of the present invention to provide electro-mechanical resonant systems of the described character with a pickup coupled to the mechanically vibrating part of the system and which generates a feedback of substantial power for automatically controlling the frequency of the oscillation generator with a circuit arrangement of very simple construction.

In accordance with an aspect of the invention, the pickup generating the feedback of substantial power includes a pickup coil in surrounding relation to a polarized magnetostrictive member which may form part of the transducer itself, or which may be mounted on, or form part of, the connecting body having compressional or standing waves set up therein by the operation of the transducer. Thus, the magnetostrictive member of the pickup is subjected to stressing at the actual frequency of operation of the mechanical part of the electro-mechanical resonant system and produces an alternating voltage in the pickup coil at the same frequency which is used to control the frequency of the oscillation generator.

In one embodiment of the invention, the oscillation generator includes two triodes and the pickup coil is connected to the control grids of the triodes by way of a grid transformer. Preferably, the secondary winding of the grid transformer has a center tap with a bias connection between the latter and the cathodes of the triodes. The anodes of the triodes are connected to the opposite ends of the primary winding of an output transformer having a center tap on the primary winding connected to a suitable power supply, and the secondary winding of the output transformer is connected to the driving coil of the transducer. Further, the transducer and the magnetostrictive member of the pickup are polarized either by permanent magnets or by a polarizing current which may be fed from a suitable source through the driving coil and the pickup coil or through independent polarizing coils.

In accordance with another aspect of this invention, the grid transformer between the pickup coil and the grids of the triodes may be eliminated by providing an independent polarizing coil at the location of a center tapped, high impedance pickup coil having its opposite ends connected directly to the control grids and its center tap suitably connected to the cathodes of the two triodes.

Further, in accordance with another embodiment of the invention, the two triodes may be replaced by corresponding transistors, while still another embodiment of the invention employs an oscillation generator with a single triode.

In each embodiment of the invention, the magnetic field of the driving coil is isolated from the pick-up coil. In those arrangements embodying the present invention which have the pickup coil in surrounding relation to a portion of the transducer itself, electrical feedback from the driving coil through the pickup coil may be effectively eliminated by providing a compensating coil located intermediate the driving and pickup coils and generating a counter field, that is, a magnetic field in opposition to the field generated by the driving coil. In an alternative construction, electrical feedback is avoided by employing a transducer having a so-called "window stack" which provides a closed path for the field generated by the driving coil. Similarly, a closed path for the magnetic field generated by the driving coil may be provided by a ferrite or other magnetic pole shoe structure extending around the portion of the transducer having the driving coil associated therewith and which may be magnetized to polarize the magnetostrictive transducer.

Further, in accordance with a feature of the invention, the cross-section dimensions of the portions of the transducer having the driving coil and pickup coil, respectively, associated therewith, may be related to each other so as to decrease the power utilized in generating the feedback voltage in the pickup coil to the minimum value that is consistent with the amplification achieved by the tubes or transistors provided in the oscillation generator.

The above, and other objects, features and advantages of the invention will be apparent in the following detailed description of illustrative embodiments thereof which is to be read in connection with the accompanying drawings forming a part hereof, and wherein:

FIG. 8 is a diagrammatic view of a further modification of the mechanical part of an electro-mechanical resonant system embodying this invention, and wherein the pickup coil in which the feedback voltage is generated is associated with a magnetostrictive member extending from the connecting body through which vibratory energy is transmitted from the transducer to a tool holder or the like;

Figure 1:
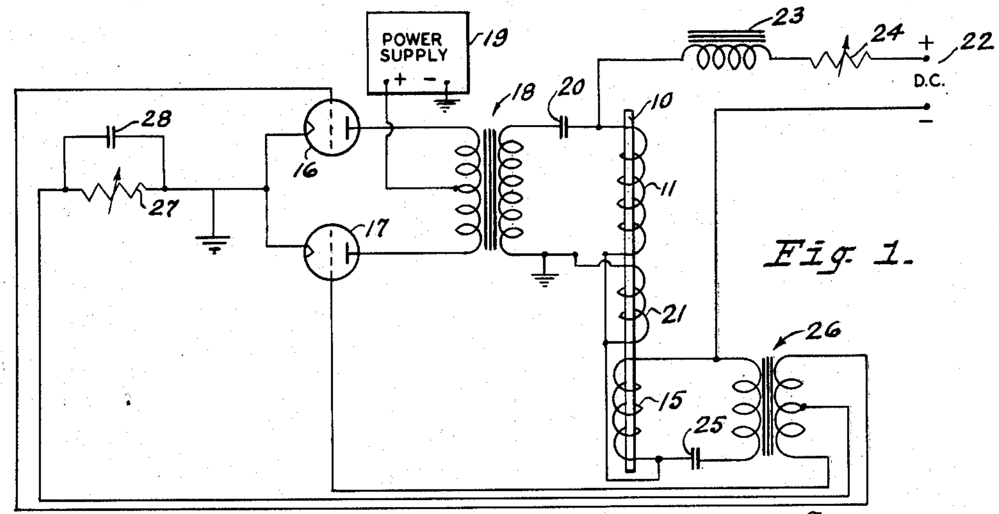
FIG. 1 is a circuit diagram illustrating an electro-mechanical resonant system embodying the present invention.
Figure 4:
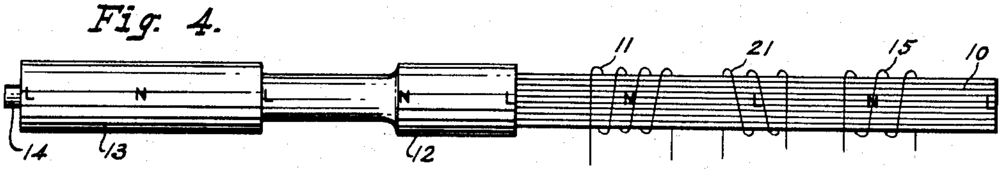
FIG. 4 is a diagrammatic view of the mechanical part of the electro-mechanical resonant system illustrated in FIG. 1.

Referring to the drawings in detail, and initially to FIGS. 1 and 4 thereof, it will be seen that an electro-mechanical resonant system embodying the invention may include a mechanical part made up of an electro-mechanical transducer 10 which is preferably of the magnetostrictive type. The transducer 10 is preferably formed of a metal, such as, permanickel, nickel, permendur, or other metals which have high tensile strength and are highly mangetostrictive in character, so that it will vibrate to a maximum degree when polarized and subjected to the influence of an alternating electro-magnetic field established by an alternating current supplied to a driving coil or winding 11 extending around the transducer.

The transducer 10 may comprise a stack of strips of the selected magnetostrictive metal secured together at one end, while the other end of the transducer is rigidly fixed, as by brazing solder, to one end of a connecting body or transmission piece 12 (FIG. 4) which may be of stepped cylindrical configuration, as shown, or have a conical output end portion so as to constitute an acoustic impedance transformer.

In place of the stack of flat metal strips forming the transducer 10 in FIG. 4, there may be substituted a stack of laterally curved strips, a bundle of metal wires or rods, preferably of rectangular cross-section so that they can be compactly assembled together, a roll of metal foil, or a longitudinally split metal tube.

In any case, the length of the magnetostrictive transducer 10 is selected so that it will be an integral number of half-wavelengths of the compressional or standing waves set up therein at the frequency of the alternating electro-magnetic field generated by alternating current fed to driving coil 11, and the latter is located at or near a nodal point N of such compressional or standing waves. Further, the connecting body 12 is also dimensioned so that its length is an integral number of half-wavelengths, and the same consideration is taken into account in the design of a holder 13 which supports a tool 14 at the output end of the connecting body 12. Thus, the tool 14 is located at a longitudinal loop of motion L of the mechanical part of the resonant system and has a vibration imparted thereto in the direction of the longitudinal axis of the mechanical part.

As is well known, the maximum or optimum amplitude of vibration at the working end of tool 14 is obtained when the frequency of the alternating current supplied to driving coil 11 is equal to a resonant or natural frequency of the mechanical part of the system, that is, the frequency setting up standing or compressional waves in the mechanical part having a half-wavelength which is divisible, by a whole number, into the total length of the mechanical part. Since the resonant frequency of the mechanical part of the system changes with tool wear, replacement of the tool, changes in temperature and changes in loading, it is apparent that the frequency at which alternating current is supplied to driving coil 11 should similarly change in order to ensure optimum or most efficient operation of the electro-mechanical resonant system.

In accordance with the present invention, an oscillation generator which supplies alternating current to driving coil 11 is automatically controlled by feedback from a pickup which is operatively associated with the mechanical part of the resonant system. The pickup includes a pickup coil or winding 15 extending around a polarized magnetostrictive member in which compressional or standing waves are set up at the actual frequency of vibration of the mechanical part of the resonant system.

In the embodiment of the invention illustrated in FIGS. 1 and 4, the pickup coil 15 extends around the end portion of polarized transducer 10 remote from connecting body 12 at a location at or near a nodal point N so that the standing or compressional waves set up in polarized transducer 10 by alternating current supplied to driving coil 11 generates an alternating voltage in pickup coil 15 at the actual frequency of the standing or compressional waves. Since pickup coil 15 is located at or near a nodal point, which corresponds to the location of maximum stressing of the transducer, the power generated in pickup coil 15 is substantial in relation to the mechanical energy expended to produce the feedback signal.

The polarizing of transducer 10 at the locations of driving coil 11 and pickup coil 15 may be effected by supplying a bias current to such coils or by permanent magnets suitably located around the transducer.

Referring to FIG. 1, it will be seen that a simple oscillation generator automatically controllable by the feedback voltage from pickup coil 15 so as to supply biased alternating current to driving coil 11 at a frequency which is accurately tuned with respect to the resonant frequency of the mechanical part of the system may include two triodes 16 and 17 having their anodes connected to the opposite ends of the primary winding of an output transformer 18 which is provided with a center tap on such primary winding connected to the positive terminal of a power supply 19 having its negative terminal connected to ground. One end of the secondary winding of transformer 18 is connected to an end of driving coil 11 by way of a capacitor 20, while the other end of the secondary winding is grounded and also connected to the other end of driving coil 11.

When a substantial power output is to be derived from the transducer 10, so that there is some danger that the electromagnetic field established by driving coil 11 will influence the pickup coil 15 and thereby cause an electrical feedback, a compensating coil 21 is disposed on the transducer 10 at a location between coils 11 and 15, for example, at a loop L of the transducer, as shown, and is connected in series with the driving coil 11, but oppositely wound, so as to establish a field which opposes the field generated by the driving coil 11. Since the compensating coil 21 is located at a loop L of the transducer, it is only weakly coupled to the latter and, therefore, does not buck out the driving effect of coil 11 which is located at a node N of transducer 10 and hence strongly coupled to the latter.

In order to polarize the magnetostrictive transducer 10 at the location of the driving coil 11 and the pickup coil 15, a bias current is fed from a suitable source, for example, the direct current source 22, through a choke 23 and through the coils 11 and 15, in series. Since the amplitude of the bias current is effective to control the power of the acoustic energy developed by the transducer 10, the bias or polarizing circuit preferably includes means for adjusting the bias current, for example, a variable resistor 24, whereby the bias current can be changed for matching the output of the electro-mechanical resonant system to large changes in the load thereon. Further, the electro-mechanical resonant system can be controlled by suitably controlling the bias current, that is, operation of the electro-mechanical resonant system can be halted by cutting off the supply of bias current to the coils 11 and 15. Further, control of the bias current is also effective to control phase shifting.

In the circuit arrangement of FIG. 1, one end of pickup coil 15 is connected through a capacitor 25 to one end of the primary winding of a grid transformer 26, while the other ends of coil 15 and the primary winding transformer 26 are directly connected to each other. The opposite ends of the secondary winding of grid transformer 26 are connected to the control grids of triodes 16 and 17, respectively, while a center tap of the secondary winding is connected through a variable resistor 27, having a capacitor 28 connected thereacross, to the grounded cathodes of both triodes 16 and 17.

From the foregoing, it will be apparent that, by reason of the relatively high power behind the alternating voltage developed in pickup coil 15, such feedback voltage can be used for directly controlling the triodes 16 and 17, thereby greatly simplifying the circuit arrangements of the electro-mechanical resonant system. In the event that the resonant frequency of the mechanical part of the system changes, by reason of tool wear, changes in the tool, temperature changes or changes in the load applied thereto, the frequency of the alternating feedback voltage, which corresponds to the actual frequency of the standing or compressional waves in transducer 10, similarly changes and thereby correlates the frequency of the alternating current fed to driving coil 11 with respect to the actual resonant frequency of the mechanical part of the system for most efficient operation thereof.

Figure 5:
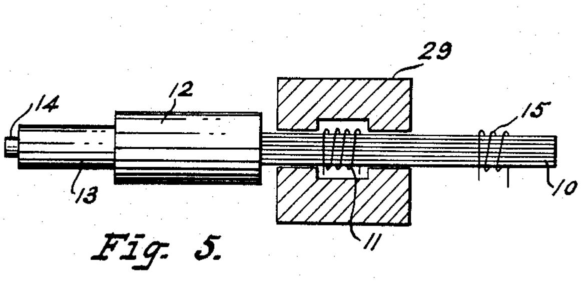
FIG. 5 is a similar diagrammatic view of the mechanical part of an electro-mechanical resonant system embodying the present invention, but wherein the necessity of providing a compensating coil is eliminated.

As shown in FIG. 5, the compensating coil 21 of FIGS. 1 and 4 can be eliminated from the transducer 10 between driving coil 11 and pickup coil 15 by providing the field generated by driving coil 11 with a closed path, for example, through an annular magnetic member 29 of ferrite or the like which extends around the transducer at the location of the driving coil 11. Thus, the magnetic field established by driving coil 11 cannot reach the location of the pickup coil 15 and therefore cannot influence the alternating voltage induced in the latter. Further, in certain applications of the present invention, the annular magnetic member 29 may be magnetized for the purpose of polarizing the transducer 10, thereby permitting elimination of the bias or polarizing current circuit appearing as part of the arrangement illustrated in FIG. 1.

Figure 6:
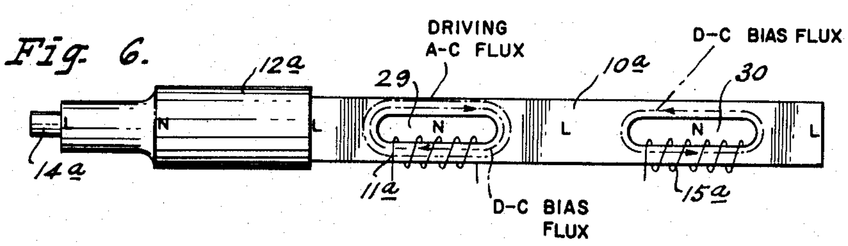
FIG. 6 is a diagrammatic representation of another arrangement of the mechanical part of the system effective to elimniate the need for a compensating coil.

In FIG. 6, still another arrangement is illustrated for permitting elimination of the compensating coil 21 provided between the driving and pickup coils on the transducer 10 of FIG. 4. The magnetostrictive transducer 10*a* of FIG. 6 is formed of a stack of strips of magnetostrictive metal having laterally aligned windows or elongated openings 29 and 30 formed therein, and the driving coil 11*a* and the pickup coil 15*a* are wound around those portions of transducer 10*a* defined between the openings or windows 29 and 30, respectively, and an adjacent longitudinal edge of the transducer. Thus, the magnetic field established by the supply of biased alternating current to driving coil 11*a* has a closed path within transducer 10*a* around window or opening 29, and such magnetic field is thereby isolated from the pickup coil 15*a*.

Figure 7:
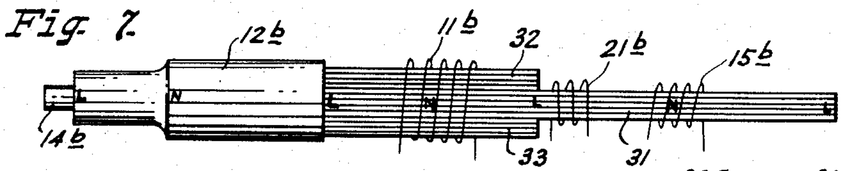
FIG. 7 is a view similar to that of FIG. 4, but showing a modified mangetostrictive transducer having driving and pickup coils associated therewith.

In the transducers illustrated in FIGS. 4, 5 and 6, the portion of the transducer surrounded by the pickup coil has substantially the same cross-sectional area as the portion of the transducer surrounded by the driving coil. However, as is shown in FIG. 7, a transducer 10*b* used in an electro-mechanical resonant system embodying this invention may have the portion thereof surrounded by the driving coil 11*b* provided with a substantially larger cross-sectional area than the end portion of the transducer which is surrounded by the pickup coil 15*b*. Where the transducer is formed of a stack of magnetostrictive strips of magnetostrictive metal, the differences between the cross-sectional areas of the transducer at the portions thereof surrounded by the coils 11*b* and 15*b*, respectively, may be conveniently realized by forming the transducer of a group of relatively long strips 31, for example, having a length equal to a whole wavelength at the frequency for which the transducer is designed, and two groups 32 and 33 of relatively short strips, for example, having a length equal to a half-wavelength, and which are disposed at the opposite sides of the group 31, with the groups of strips 31, 32 and 33 all being aligned at the end of the transducer 10*b* rigidly connected to the connecting body or transmission piece 12*b*. Thus, the portion of the transducer 10*b* surrounded by driving coil 11*b* is constituted by the magnetostrictive strips in all three groups 31, 32 and 33, whereas the portion of the transducer surrounded by the pickup coil 15*b*, and also by the compensating coil 21*b*, if the latter is required, is constituted only by the strips of group 31.

It will be apparent that the power utilized to establish compressional waves in the transducer portion of reduced cross-section is small in relation to the power that would be required in the case of the portion of the transducer 10 surrounded by coil 11 in FIG. 1. Although the feedback power is also reduced, even such reduced feedback is adequate to accurately control the frequency of the oscillation generator without resort to preamplification, as the usual ratio of driving power to output power is approximately 1:20 in most power tubes. The extent of the reduction of the feedback power that is permitted is dependent upon the amplification factor of the oscillation generator.

Figure 8:
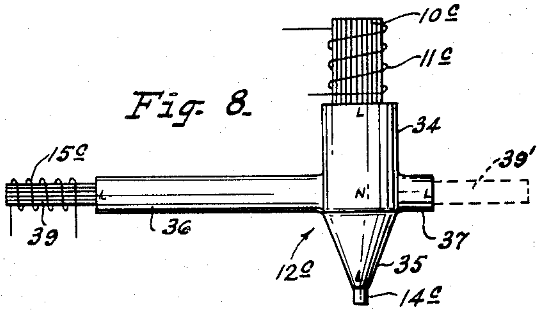

In each of the previously described embodiments of this invention, the pickup coil 15, 15*a* or 15*b* has been associated with a portion of the magnetostrictive driving transducer in which compressional or standing waves are set up in response to the supplying of alternating or biased alternating current to the driving coil, depending upon whether or not the transducer is otherwise polarized. However, in accordance with the present invention, the pickup coil from which controlling feedback voltage is supplied to the oscillation generator may be associated with a magnetostrictive member other than the driving transducer, but which is coupled to the mechanical part of the resonant system so as to have compressional or standing waves set up therein at the same frequency as that of the compressional or standing waves set up in the driving transducer. Thus, as shown in FIG. 8, the mechanical part of an electro-mechanical resonant system embodying this invention may include a generally cross-shaped connecting body or transmission piece 12c having a head portion 34, to which a magnetostrictive driving transducer 10C may be rigidly connected, as shown, and an output portion 35 longitudinally aligned with the head portion and to which a load may be applied, for example, in the form of a tool holder carrying a suitable tool. The output portion 35 may be of tapering or conical configuration, as shown, so as to increase or amplify the amplitude of vibrations at the output end with respect to the amplitude of the vibrations at the end of head portion 34 connected to the transducer. The cross-shaped connecting body 12C is dimensioned so that the distance or length between the end surfaces of portions 34 and 35 is a whole multiple of a half-wavelength of the standing or compressional waves set up therein in response to the supplying of biased alternating current to the driving coil 11c surrounding the driving transducer 10c, whereby a loop of longitudinal motion occurs at the output end of portion 35. The connecting body 12c further includes lateral extensions 36 and 37 located at the opposite sides thereof at a node of longitudinal motion of the connecting body, and the end faces of lateral extensions 36 and 37 are also spaced apart by a distance equal to a whole multiple of the half-wavelength so that such end faces are also located at loops of longitudinal motion in the lateral direction.

In the embodiment of FIG. 8, a polarized magnetostrictive rod 39 is rigidly secured, at one end, to the end face of lateral extension 36 which is relatively long so as to dispose the pickup coil 15c on rod 39 at a location remote from driving coil 11c, although such magnetostrictive rod may be alternatively secured to the end face of lateral extension 37, as indicated in broken lines at 39'. The length of the magnetostrictive rod 39 is also equal to a whole multiple of the half-wavelength.

It will be apparent that the energizing of driving coil 11c causes transducer 10c to set up compressional or standing waves in connecting body 12c which produce vibrations in the vertical direction, as viewed in FIG. 8, at the lower or output end face of portion 35, and vibrations in the horizontal direction at the end faces of lateral extensions 36 and 37, and that the vibrations of the end surface of extension 36 are transmitted to magnetostrictive member 39 to generate an alternating feedback voltage in pickup coil 15C. Since the magnetostrictive rod or member 39 is connected to the connecting body 12c and has compressional or standing waves set up therein at the same frequency as the compressional or standing waves set up in connecting body 12c, it will be apparent that the feedback voltage from pickup coil 15c may be employed, as in the previously described embodiments of this invention, in order to control the frequency of the oscillation generator supplying alternating current to the driving coil 11c.

Figure 9:
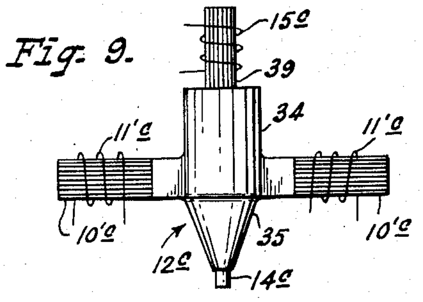
FIG. 9 is a view similar to that of FIG. 8, but showing another arrangement embodying the invention.

Although the arrangement of FIG. 8 has the driving transducer 10c connected to the head portion 34 of cross-shaped connecting body 12c and the magnetostrictive member 39 associated with the pickup coil 15c extending from one of the lateral projections 36 and 37, it is to be understood that the driving transducer 10c and the magnetostrictive member or rod 39 associated with the pickup coil may be otherwise arranged with respect to the connecting body 12c. Thus, as shown in FIG. 9, the pickup coil 15c can be in surrounding relation to a magnetostrictive member or rod 39 which extends longitudinally from the head portion 34 of connecting body 12c, while two driving transducers 10'c are secured to the lateral extensions 36 and 37 of the connecting body and have driving coils 11'c in surrounding relation thereto. The driving coils 11'c may be energized from individual oscillation generators, thereby to increase the power input to the connecting body, for example, when a high load is to be applied thereto, and the feedback voltage from the single pickup coil 15c can be employed for simultaneously controlling the frequency of both oscillation generators, thereby to ensure that both generators operate at the same frequency.

Figure 10:
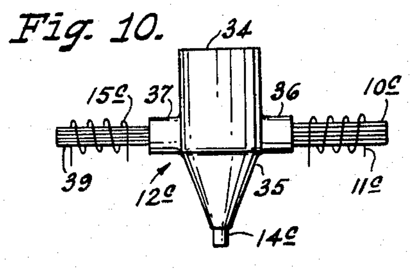
FIG. 10 is also a view similar to that of FIG. 8, but showing still another arrangement embodying the invention.

A further modification of the arrangement of FIG. 8 is illustrated in FIG. 10 wherein the driving transducer 10c is connected to the lateral extension 36 of connecting body 12c and the magnetostrictive member or rod 39 of pickup coil 15c is connected to the other lateral extension 37. By reason of the conical configuration of portion 35 of connecting body 12c, the amplitude of the vibrations at the end surface of portion 35 will be substantially greater than the amplitude of the vibrations at the end surface of head portion 34. Thus, the end surfaces of portions 34 and 35 can be employed for operating tools or performing other operations which require vibrations of different amplitudes.

Figure 12:
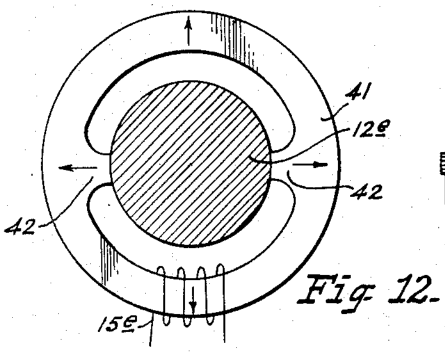
FIG. 12 is a transverse sectional view taken along the line 12—12 of FIG. 11.
Figure 11:
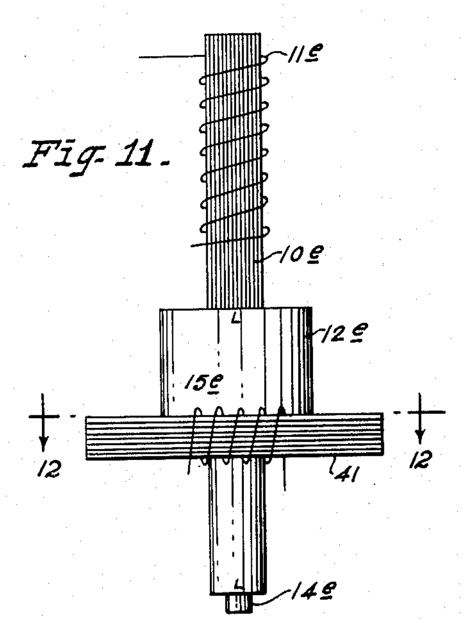
FIG. 11 is a diagrammatic view showing another arrangement embodying the invention.

Referring now to FIGS. 11 and 12, it will be seen that the magnetostrictive member associated with the pickup coil 15e in the mechanical part of a resonant system embodying this invention may also be in the form of a magnetostrictive ring 41 which extends around the connecting body 12e at a nodal point of the latter and which is radially spaced from the connecting body with the exception of two diametrically opposed, inwardly directed lugs 42 extending from ring 41 and being rigidly connected, as by brazing solder or the like, to the connecting body 12e. When biased alternating current is supplied to the driving coil 11e in surrounding relation to a magnetostrictive transducer 10e rigidly connected to connecting body 12e, the standing or compressional waves set up in the connecting body have loops L of longitudinal motion at the opposite ends of the connecting body and a node N of longitudinal motion at the location of magnetostrictive ring 41. Thus, there is vibration in the longitudinal direction at the free end surface of the connecting body 12e, and corresponding radial expansion and contraction of the cylindrical surface of the connecting body at the location of the nodal point, so that radial vibrations are transmitted to ring 41 through the diametrically opposed lugs 42. The ring 41 is dimensioned so that its circumference, at the mean diameter thereof, is equal to a full wavelength of the standing or compresional waves set up in ring 41. The compressional or standing waves set up in the magnetostrictive ring 41 are effective to generate a corresponding alternating feedback voltage in a pickup coil 15e which is wound around a portion of the ring.

Figure 13:
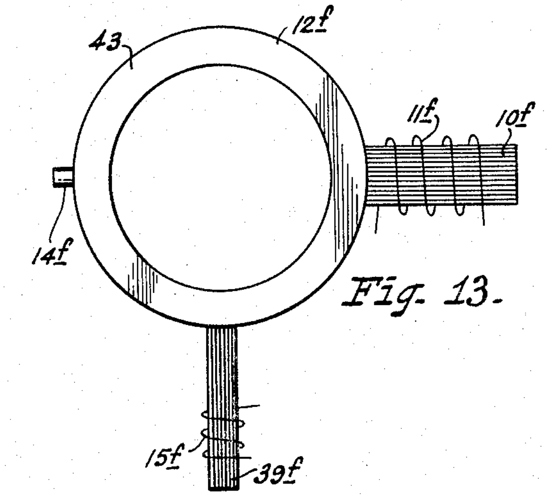
FIG. 13 is a diagrammatic view of another arrangement of the mechanical part of an electro-mechanical resonant system embodying the present invention.

FIG. 13 illustrates still another modification of the mechanical part of a resonant system embodying this invention, wherein the connecting body 12f is in the form of a ring having the driving transducer 10f extending radially from the periphery thereof so that, when biased alternating current is supplied to the driving coil 11f in surrounding relation to transducer 10f, standing or compressional waves set up in the driving transducer are transmitted to the connecting body 12f and, particularly when the ring shaped connecting body has a circumference, at its mean diameter, equal to a wavelength of the compressional or standing waves set up therein, the entire peripheral surface of the ring shaped connecting body is made to vibrate radially. Thus, a load can be applied to the periphery of ring-shaped connecting body 12f at any location thereon, for example, at the location 43. With the arrangement illustrated in FIG. 13, the magnetostrictive member associated with the pickup coil 15f may be in the form of a rod 39f having a length equal to a whole multiple of a half-wavelength of the standing or compressional waves set up in the connecting body, and such magnetostrictive rod 39f is rigidly secured, as by brazing solder or the like, to a suitable location at the periphery of the connecting body and extends radially therefrom. It will be apparent that standing or compressional waves are also set up in the magnetostrictive rod 39f at the actual frequency of the waves in the connecting body so that an alternating voltage at the same frequency is generated in pickup coil 15f for use as a feedback in controlling the frequency of the oscillation generator supplying the energizing current to driving coil **11*f***.

Figure 2:
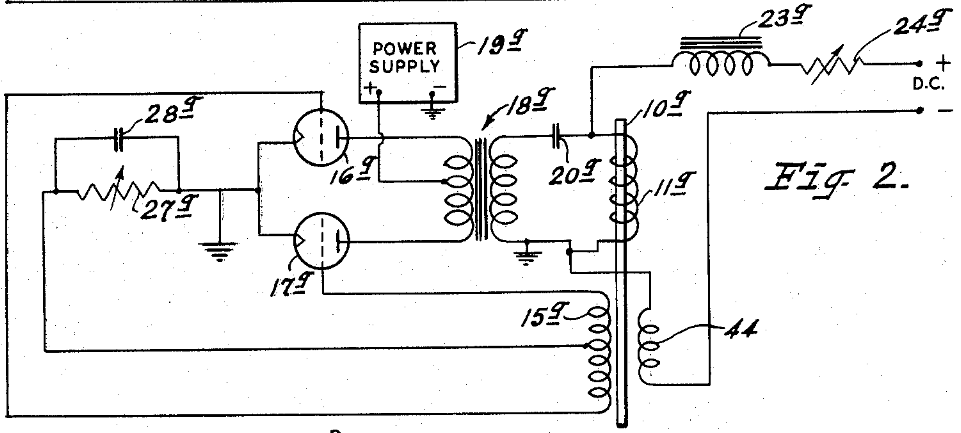
FIG. 2 is a circuit diagram similar to that of FIG. 1, but illustrating a simpler embodiment of the invention.

Referring now to FIG. 2, it will be seen that a circuit arrangement which is substantially similar to that illustrated in FIG. 1, and wherein the various components are identified by the same reference numerals employed in connection with the corresponding parts of the first described circuit arrangement, but with the letter "*g*" appended thereo, may be designed so as to eliminate the need for the grid transformer 26 of FIG. 1. In the circuit arrangement of FIG. 2, the ends of the pickup coil **15*g*, which is in surrounding relation to the transducer 10*g*, are connected directly to the control grids of triodes 16*g* and 17*g*, and the pickup coil has a high impedance and is provided with a center tap which is connected to the cathodes of the triodes by way of a variable resistor 27*g* having the capacitor 28*g* connected thereacross. Further, in the circuit arrangement of FIG. 2, the portion of the transducer 10*g* having the high impedance, center tapped pickup coil 15*g* in surrounding relation thereto is polarized by feeding the polarizing current through a polarizing coil 44 which is connected in series with the driving coil 11*g* and is in surrounding relation to the transducer 10*g* at the same location as the pickup coil. In the circuit arrangement of FIG. 2, the high impedance, center tapped pick up coil 15*g*** serves to replace the grid transformer of the arrangement illustrated in FIG. 1.

Figure 3:
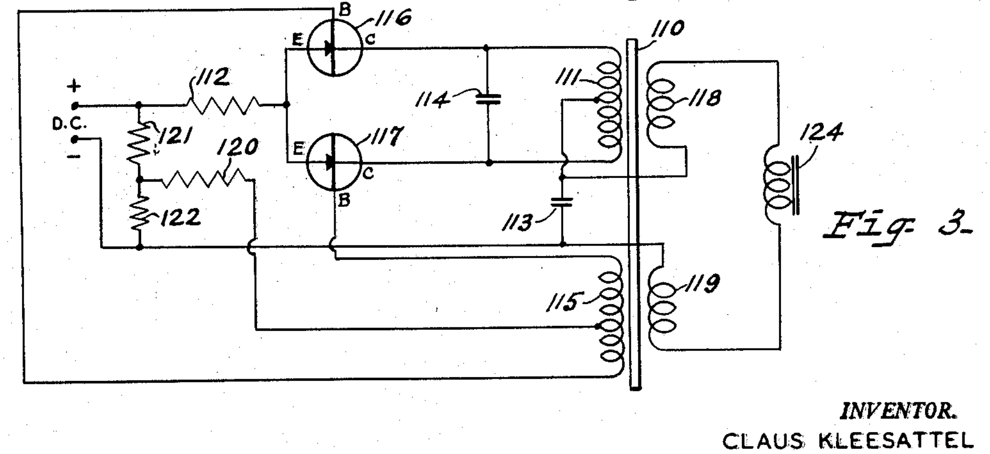
FIG. 3 is a circuit diagram of an electro-mechanical resonant system similar to that of FIG. 2, but having a transistorized oscillation generator.

In each of the circuit arrangements of FIGS. 1 and 2, the oscillation generator includes a pair of triodes, but it is to be understood that a transistorized oscillation generator may be provided for supplying alternating current to the driving coil at a frequency which is controlled by the feedback voltage from a pickup coil associated with a magnetostrictive member which may be part of the driving transducer, part of the connecting body or transmission piece extending from the transducer, or mounted on such connecting body. More specifically, as shown in FIG. 3, a transistorized circuit arrangement embodying the present invention may include two transistors 116 and 117 for "push-pull" operation, with each transistor having an emitter E, a base B and a collector C. The emitters E of both transistors 116 and 117 are connected through a resistor 112 to the positive terminal of a direct current power supply, while the bases B of transistors 116 and 117 are directly connected to the opposite ends of a center tapped pickup coil 115 which is in surrounding relation to the driving transducer 110. The collectors C of the transistors 116 and 117 are connected to the opposite ends of a center tapped driving coil 111 which is in parallel with a capacitor 114 and also in surrounding relation to the transducer 110, and the center tap of driving coil 111 is connected, by way of a filter capacitor 113 to the negative terminal of the D.C. power supply. In order to polarize the magnetostrictive transducer 110, polarizing coils 118 and 119 are provided in surrounding relation to the transducer at the locations of the coils 111 and 115, respectively, and are connected in series with a choke 24 between the center tap of driving coil 111 and the negative terminal of the D.C. power supply. Finally, the center tap of pickup coil 115 is connected by way of resistors 120, 121 and 122 to both terminals of the D.C. power supply.

It will be apparent that the arrangement shown in FIG. 3 elimniates both the output transformer 18 and the grid transformer 26 of the circuit arrangement illustrated in FIG. 1. Further, if permanent polarizing magnets are associated with the transducer 110, for example, as previously described in connection with FIG. 5, the filter capacitor 113, the polarizing coils 118 and 119 and the filter choke 124 may be eliminated from the circuit arrangement of FIG. 3.

It will be noted that the circuit arrangements of FIGS. 2 and 3 do not include compensating coils arranged on the transducer between the driving and pickup coils. As has been previously mentioned, the need for such compensating coils may be eliminated by adopting the measures described in connection with FIGS. 5 and 6, in the case of pickup coils associated with portions of the driving transducers, and such compensating coils are also unnecessary when the pickup coil is remote from the driving coil, for example, in surrounding relation to a magnetostrictive member extending from the connecting body or transmission piece, as in FIGS. 8, 9, 10, 11, 12 and 13. However, if necessary, a compensating coil may be provided on the transducer **10*g* of FIG. 2 between driving coil 11*g* and pickup coil 15*g*, with such compensating coil being connected in series with the driving coil 11*g* between the latter and the grounded end of the secondary winding of output transformer 18*g*. Similarly, a compensating coil can be provided in surrounding relation to the transducer 110 of FIG. 3 at a location between driving coil 111 and pickup coil 115, with such compensating coil being connected in series with driving coil 111**. When a compensating coil is added to the circuit arrangements of FIGS. 2 and 3, the compensating coil is wound in the opposite direction from the related driving coil so as to produce a counter field which avoids any electrical fedeback by reason of influence of the field established by the driving coil upon the related pickup coil.

Figure 14:
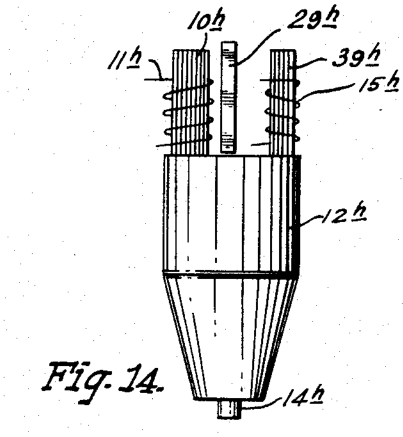
FIG. 14 is a diagrammatic view of still another arrangement of the mechanical part of an electro-mechanical resonant system embodying the present invention.

Another arrangement of the mechanical part of an electromechanical resonant system embodying this invention, and which does not require a compensating coil, is illustrated in FIG. 14. In this arrangement, the driving transducer **10*h*, having the driving coil 11*h* in surrounding relation thereto, and the magnetostrictive member 39*h*, having the pick-up coil 15*h* in surrounring relation thereto, extend parallel to each other from one end of the connecting body 12*h*. Electrical feedback resulting from influence of the field established by driving coil 11*h* on the feedback voltage induced in pickup coil 15*h*, is avoided by providing a shielding wall 29*h*, for example, of copper, between the transducer 10*h* and the member 39*h***.

The transducer **10*h* and the member 39*h*** may each have a length equal to a half-wavelength so that the overall length of the mechanical part of the system is advantageously reduced as compared with the arrangements in FIGS. 4, 5, 6 and 7 wherein the transducer has a length equal to at least two times the half-wavelength. Further, the reduction in overall length is achieved without increasing the lateral dimensions of the mechanical part of the system.

Figure 15:
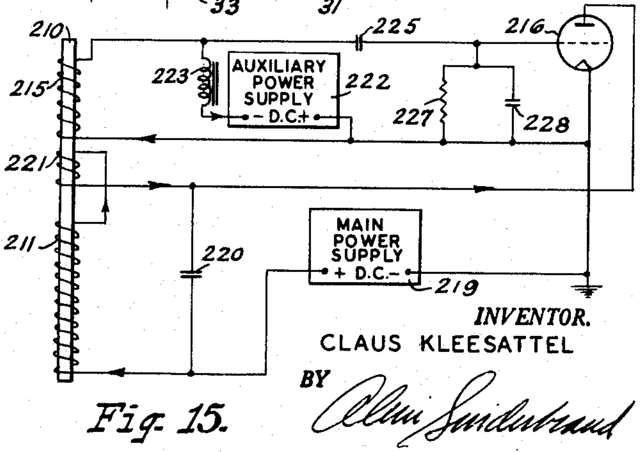
FIG. 15 is a circuit diagram of still another electro-mechanical resonant system embodying this invention.

In FIG. 15 there is illustrated a further simplified circuit arrangement embodying the invention in association with a magnetostrictive transducer 210 having a driving coil 211, a pickup coil 215 and a compensating coil 221 in surrounding relation to portions thereof, for example, as in the embodiments of FIGS. 4 and 7. A main D.C. power supply 219 has its positive terminal connected to one end of driving coil 211 which is connected in series with one end of the oppositely wound compensating coil 221. The other end of coil 221 is connected to the anode of a single triode 216, and a capacitor 220 is connected in parallel with coils 211 and 221 for impedance matching purposes. The negative terminal of power supply 219 is connected to ground and to the cathode of triode 216.

One end of pickup coil 215 is also connected to the cathode of triode 216, while the other end of coil 215 is connected to the grid of tube 216 through a coupling capacitor 225. A resistor 227 and capacitor 228 are connected in parallel across the grid and cathode of triode 216 to provide a bias for the latter, and an auxiliary D.C. power supply 222 is connected in series with a choke 223 across the pickup coil 215 for polarizing the magnetostrictive transducer associated with the latter.

The driving coil 211 preferably has a high impedance so that the D.C. plate current of the triode polarizes the driving transducer.

It will be apparent that, in the simplified circuit arrangement of FIG. 15, as in the other previously described circuit arrangements, the relatively high alternating power developed in pickup coil 215 is used for directly controlling the single triode 216 which feeds alternating current to the driving coil 211 at the actual resonant frequency of the mechanical part of the system, as sensed by coil 215.

If tube 216 is replaced by a transistor, then the auxiliary power supply 222 can be eliminated in a manner similar to that disclosed in FIG. 3.

From the foregoing, it will be apparent that the electromechanical resonant systems embodying the present invention ensure the efficient operation thereof by automatically correlating the frequency of the alternating current fed to the driving coil with the resonant frequency of the work performing, variably loaded mechanical part of the system, and that the automatic control of the frequency is established by a feedback voltage of substantial power obtained from a pickup coil in surrounding relation to a magnetostrictive member which is included in the mechanical part of the system. By reason of the substantial power of the feedback signal, the circuit arrangements of the feedback generators may be considerably simplified.

Although a number of illustrative embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention, except as defined in the appended claims.

What is claimed is:

1. An electro-mechanical resonant system comprising a work performing, variably loaded mechanical part including a polarized, magnetostrictive transducer member operatively connected to a tool and having a driving coil in surrounding relation thereto, oscillation generating means operative to supply alternating current to said driving coil so that the latter establishes an alternating electromagnetic field which sets up compressional waves in said transducer member at a resonant frequency of said mechanical part, a pickup coil in surrounding relation to a polarized magnetostrictive member which is also included in said mechanical part to have compressional waves set up therein at the actual frequency of said compressional waves in the transducer member, thereby to produce a corresponding alternating feedback voltage in said pickup coil, said mechanical part, and each of said magnetostrictive members included therein, having lengths which each are an integral number of half wavelengths of said compressional waves set up therein and said driving and pick-up coils being located substantially at nodes of the compressional waves in the related magnetostrictive members so that said feedback voltage is of substantial magnitude, means isolating said electromagnetic field established by said driving coil from said pickup coil to prevent influence of said electromagnetic field upon said alternating feedback voltage, and circuit means connecting said pickup coil to said oscillation generating means to cause said alternating current supplied from the latter to said driving coil to be controlled by said alternating feedback voltage, and thereby maintain said frequency of the supplied alternating current substantially equal to the actual resonant frequency of said mechanical part in the loaded condition of the latter.

2. An electro-mechanical resonant system as in claim 1; wherein said isolating means includes magnetic shielding means between said driving and pickup coils to isolate said pickup coil from said electromagnetic field.

3. An electro-mechanical resonant system as in claim 1; wherein said isolating means includes electrically energized means generating an electromagnetic compensating field counter to the first mentioned electromagnetic field for isolating the latter from said pickup coil.

4. An electro-mechanical resonant system as in claim 1; wherein said isolating means includes magnetically conducting means closing said electromagnetic field established by said driving coil so as to isolate said field from said pickup coil.

5. An electro-mechanical resonant system comprising a mechanical part including a polarized magnetostrictive transducer having a driving coil operatively associated therewith and a connecting body with arms extending from said transducer and carrying a work performing tool imposing a variable load on said transducer, oscillation generating means operative to supply alternating current to said driving coil so as to set up compressional waves in said transducer and connecting body at a resonant frequency of said mechanical part, a polarized magnetostrictive member extending from said connecting body to have compressional waves set up therein at the same frequency as said compressional waves in said transducer and connecting body, a pickup coil in surrounding relation to said magnetostrictive member to cause an alternating feedback voltage to be produced in said pickup coil in response to said compressional waves, and circuit means connecting said pickup coil to said oscillation generating means to control the frequency of the alternating current supplied from the latter to said driving coil and thereby maintain said frequency of the supplied alternating current substantially equal to the actual resonant frequency of said mechanical part in the loaded condition of the latter, said connecting body being generally cross-shaped and including first and second longitudinally aligned arms and third and fourth longitudinally aligned arms arranged at right angles to said first and second arms, the distances between the ends of said first and second arms and between the ends of said third and fourth arms, respectively, being equal to integral numbers of half wavelengths of said compressive waves set up in the connecting body, said arms being connected to each other at nodal points of the compressive waves therein so that the end of each arm is at a loop of motion, said magnetostrictive transducer, said magnetostrictive member and said tool extending from the ends of respective arms of said connecting body.

6. An electro-mechanical resonant system as in claim 5; wherein the arm from which said magnetostrictive member extends is of substantial length so as to dispose said pickup coil remote from said driving coil and thereby isolate the electromagnetic field established by the alternating current supplied to said driving coil from any influence on said feedback voltage.

7. An electro-mechanical resonant system as in claim 5; wherein said transducer extends from one of said arms of the cross-shaped connecting body, and said magnetostrictive member extends from another arm of said body extending at right angles to said arm from which said transducer extends.

8. An electro-mechanical resonant system as in claim 5; wherein said transducer and magnetostrictive member are connected to the opposite ends of said first and second arms of the cross-shaped connecting body.

9. An electro-mechanical resonant system comprising a work performing, variably loaded mechanical part including a polarized magnetostrictive transducer having a driving coil operatively associated with a portion thereof, oscillation generating means operative to supply alternating current to said driving coil so as to set up compressional waves in the transducer at a resonant frequency of said mechanical part, a pickup coil in surrounding relation to another portion of said transducer in which said compressional waves produce a corresponding alternating feedback voltage in said pickup coil, said other portion of the transducer related to said pickup coil having a substantially smaller cross-sectional area than the first mentioned portion of the transducer related to said driving coil, thereby to minimize the energy expended to producing the compressional waves in said other portion of the transducer, said mechanical part and each of said portions thereof having lengths which are integral numbers of half wavelengths of said compressional waves produced therein and said driving and pick-up coils being located substantially at nodes of said compressional waves in the related portions so that said feedback voltage is of substantial magnitude, and circuit means connecting said pickup coil to said oscillation generating means to control the frequency of the alternating current supplied from the latter to said driving coil and thereby maintain said frequency of the supplied alternating current substantially equal to the actual resonant frequency of said mechanical part in the loaded condition of the latter.

10. An electro-mechanical resonant system as in claim 9; wherein said transducer includes a stack of magnetostrictive strips having longer and shorter lengths, respectively, said first mentioned portion of the transducer being defined by said strips having shorter lengths and by the corresponding adjacent parts of said strips having longer lenghts, and said other portion of the transducer being defined by the parts of said strips having longer lengths which project beyond said strips having shorter lengths.

11. An electro-mechanical resonant system comprising a mechanical part including a polarized magnetostrictive transducer having a driving coil operatively associated therewith and a connecting body extending from said transducer and carrying a work performing, variably loaded tool, oscillation generating means operative to supply alternating current to said driving coil so as to set up compressional waves in said transducer and connecting body at a resonant frequency of said mechanical part, a polarized magnetostrictive member extending from said connecting body in parallel, side-by-side relation to said transducer to have compressional waves set up therein at the same frequency as said compressional waves in said transducer and connecting body, said mechanical part and said transducer and connecting body included therein and said magnetostrictive member having respective lengths which are integral numbers of half wavelengths of said compressional waves produced therein, said driving coil being located substantially at a nodal point of the compressional waves in said transducer, a pickup coil in surrounding relation to said magnetostrictive member substantially at a nodal point of the compressional waves in the latter to cause an alternating feedback voltage of substantial magnitude to be produced in said pickup coil in response to said compressional waves, and circuit means connecting said pickup coil to said oscillation generating means to control the frequency of the alternating current supplied from the latter to said driving coil and thereby maintain said frequency of the supplied alternating current substantially equal to the actual resonant frequency of said mechanical part in the loaded condition of the latter.

12. An electro-mechanical resonant system as in claim 3 wherein said electrically energized means includes a compensating coil in surrounding relation to said transducer member intermediate said driving coil and said pick-up coil and also receiving said alternating current from the oscillation generator so as to establish said field counter to the first mentioned electromagnetic field.

13. An electro-mechanical resonant system as in claim 1; wherein said magnetostrictive member is an integral portion of said transducer member and the latter has spaced apart windows therein receiving said driving coil and said pick-up coil, respectively, so that the alternating electromagnetic field established by the driving coil has a closed path around the related window which thereby constitutes said means isolating the electromagnetic field established by the driving coil from said pick-up coil.

References Cited in the file of this patent

UNITED STATES PATENTS

| | | |
|---|---|---|
| Re. 19,461 | Pierce | Feb. 12, 1935 |
| 1,966,446 | Hayes | July 17, 1931 |
| 1,882,394 | Pierce | Oct. 11, 1932 |
| 2,498,760 | Kreithen | Feb. 28, 1950 |
| 2,587,593 | Camras | Mar. 4, 1952 |
| 2,848,672 | Harris | Aug. 19, 1958 |
| 2,872,578 | Kaplan | Feb. 3, 1959 |
| 2,916,704 | Morey | Dec. 8, 1959 |